United States Patent
Luinstra

[15] 3,691,998
[45] Sept. 19, 1972

[54] LIVESTOCK HEADGATE

[72] Inventor: Wilbert L. Luinstra, May City, Iowa 51349

[22] Filed: Nov. 5, 1970

[21] Appl. No.: 87,127

[52] U.S. Cl. ................................................. 119/98
[51] Int. Cl. ........................................... A61d 03/00
[58] Field of Search .................. 119/98, 99, 103, 147

[56] References Cited

UNITED STATES PATENTS

| | | |
|---|---|---|
| 2,801,612 | 8/1957 | McMurray et al. ........... 119/98 |
| 2,566,013 | 8/1951 | Abernathy ................. 119/103 |
| 3,221,707 | 12/1965 | Pearson ...................... 119/98 |

Primary Examiner—Hugh R. Chamblee
Attorney—Roy G. Story

[57] ABSTRACT

A livestock headgate having a stanchion with a pair of swinging gates, a synchronizing mechanism for closing the gates simultaneously, stop latches to hold the gates in a closed position and adjustable stop means for limiting the size of the opening between the gates.

7 Claims, 9 Drawing Figures

PATENTED SEP 19 1972 3,691,998
SHEET 1 OF 3
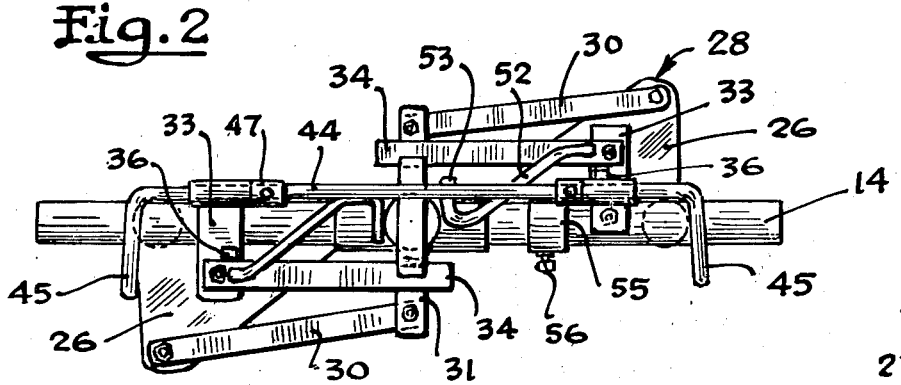
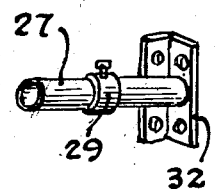
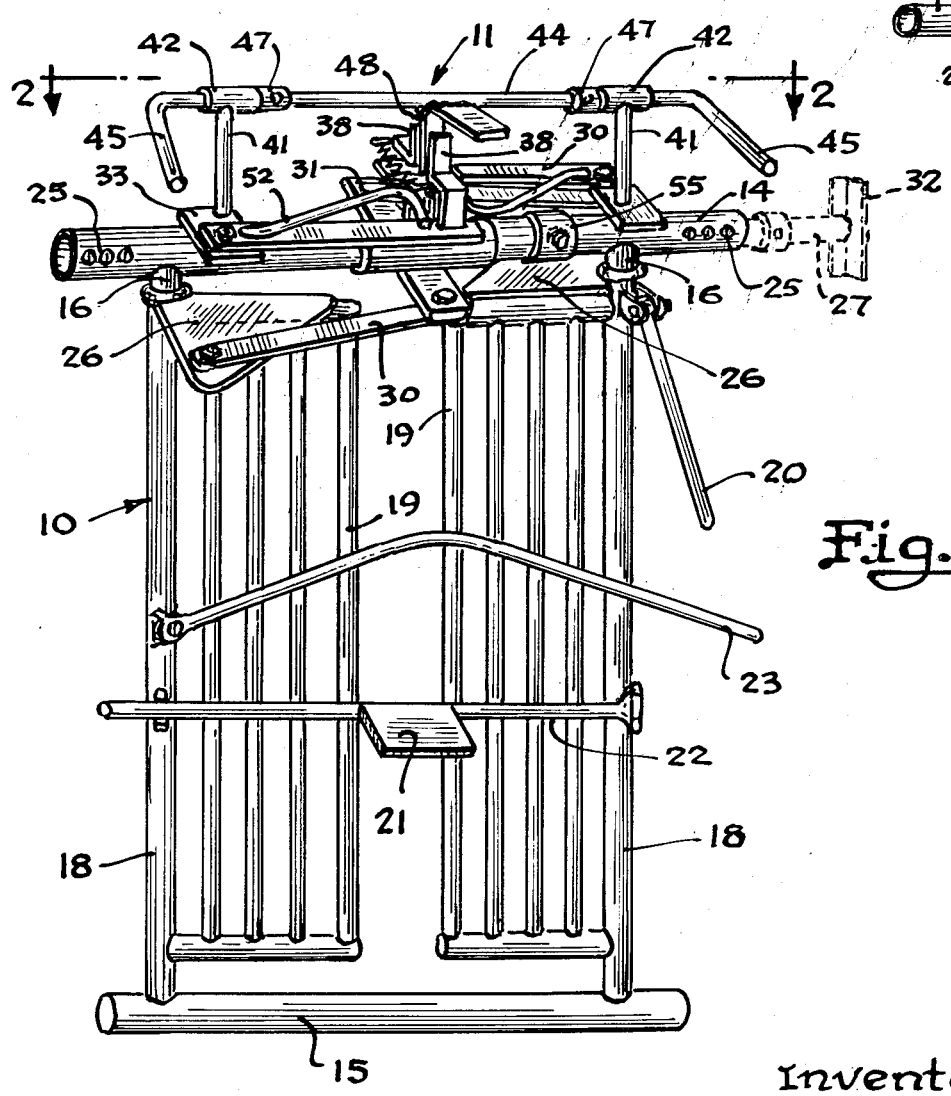
Inventor
Wilbert L. Luinstra
By Roy G. Story
Attorney

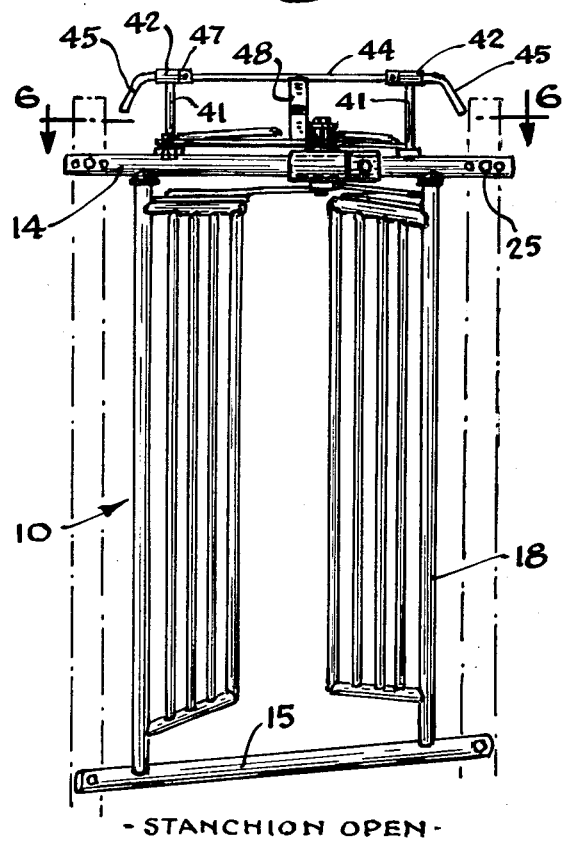
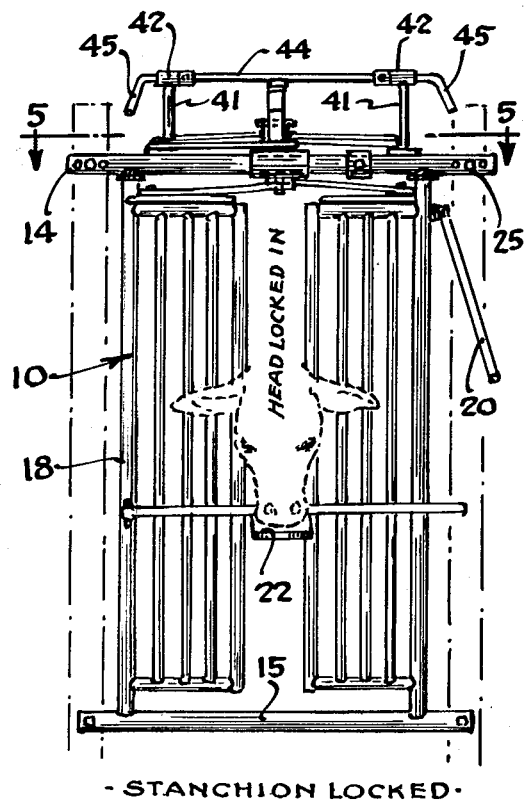
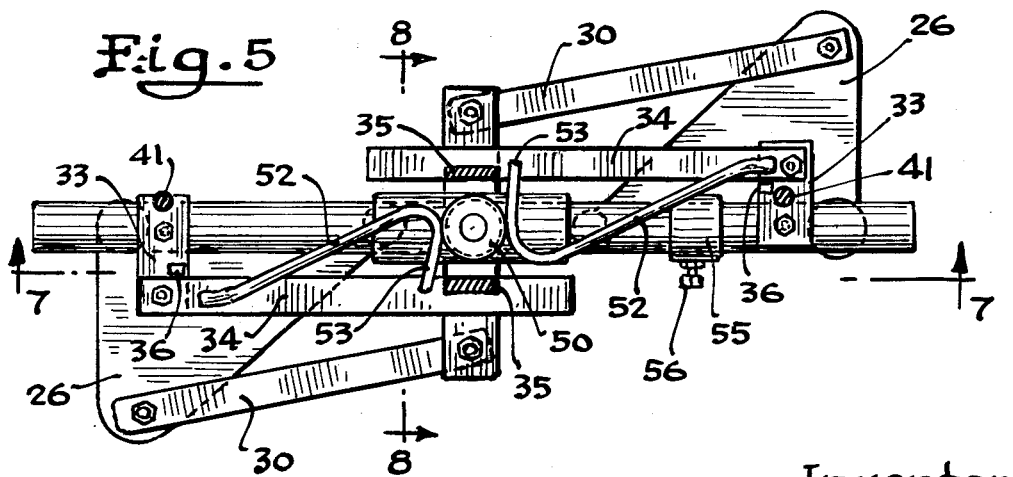

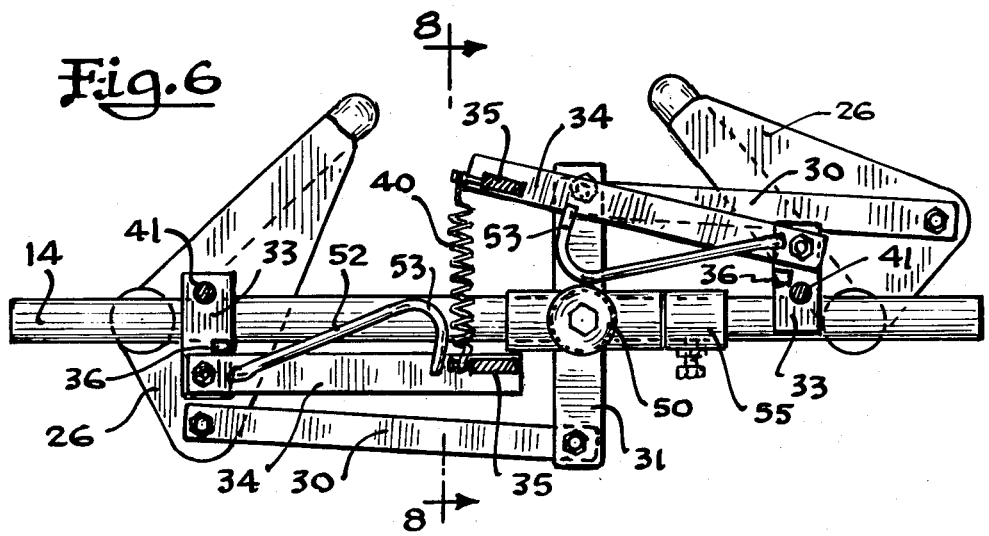
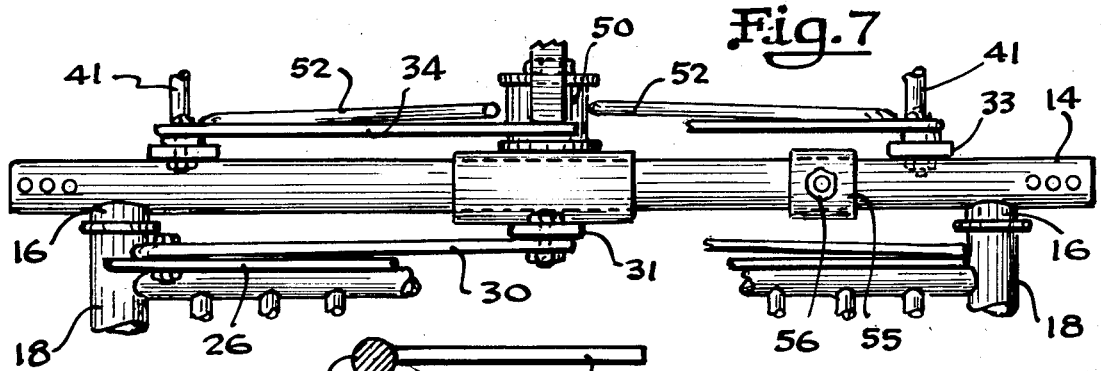
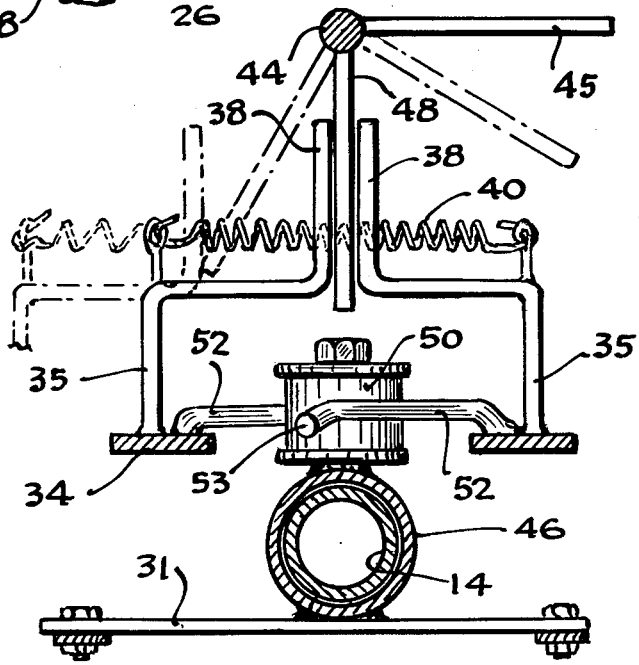

LIVESTOCK HEADGATE

This invention relates to gates and more particularly to a headgate for livestock. The gate may be installed in chutes, alleys, barn doors and the like. While the gate has general application, its principal use is for a stanchion to hold the heads of cattle and other animals.

In the handling of live stock, such as cattle, it is often necessary to confine the animal for performing certain operations thereon including blood testing, artificial insemination, ear tagging, pregnancy testing and other work. The devices for such confining must be of rugged construction, but be conveniently operated and versatile in the locking and releasing actions. The device of the present invention can be operated from either side to lock the headgate or to release the animal forwardly or backwardly. The sides of the stanchion may be cocked in toward the animal just wider than the head, and the forward movement of the animal automatically closes and locks the stanchion.

The present invention is directed to a locking mechanism in association with a head gate and has for its principal object the provision of an article of manufacture including a split stanchion having a pair of swinging gates or wings, a synchronized closing mechanism, a locking device or latch to control the movement of the gates and preferably a stop means for adjusting the size of the opening between the wings.

FIG. 1 is a perspective view of the headgate and locking mechanism with the gate closed and locked.

FIG. 1A is a perspective view of an adjustable bracket for mounting the stanchion in variable size openings.

FIG. 2 is a top view along the line 2—2 of FIG. 1.

FIG. 3 is a perspective view of the headgate and locking device with the gate in an open position.

FIG. 4 is a perspective view of the headgate with the gate closed and the head of a cow locked therein.

FIG. 5 is a sectional view along the line 5—5 of FIG. 4.

FIG. 6 is a sectional view along the line 6—6 of FIG. 3.

FIG. 7 is a sectional view along the line 7—7 of FIG. 5.

FIG. 8 is a sectional view along the line 8—8 of FIGS. 5 and 6 showing the gate closed as a solid line and the gate open as a broken line in FIG. 8.

Referring to FIG. 1, the mechanism of the invention comprises a stanchion or gate designated generally by the numeral 10 and a locking device indicated generally by the numeral 11. The stanchion contains a top pipe 14, a bottom pipe 15 and side pipes 16 which are welded into a frame. The top pipe and bottom pipe are preferably about two inches in diameter and the side pipes are about one and one-half inches in diameter. Surrounding each of the side pipes 16 is a two inch pipe 18 forming a hinge for the swinging sides or wings 19 which may be closed or opened by the swivel handle 20. As optional attachments for the gate are a nose plate 21 secured to a swivel bar 22 and a head holding lever 23, the latter elements being useful for holding the head of the animal in such operations as dehorning. The stanchion may be installed in a chute, alley or barn door by screws or other fastening means inserted in the holes 25 of the top pipe 14 as shown by the dotted lines at the sides of FIGS. 3 and 4. If it is desired to adapt the stanchion to various size openings, an adjustable mounting bracket as shown in FIG. 1A may be attached to one or both sides of the frame. The mounting bracket comprises a short pipe 27 the free end of which may be inserted in the end of pipe 14 or 15, an adjustable stop 29 and an end plate 32. The stanchion or gate 10 is illustrative of one embodiment and other types of gates may be employed.

Welded to the top of the gate are plates 26 to control the movement of the wings 19. Attached to the plates is a synchronizing mechanism indicated generally by the numeral 28 (FIG. 2) for closing both of the wings at the same time. The synchronizer has arms 30 which are attached at one end to the plates 26 and at the other end to a cross bar 31. The synchronizer operates in a horizontal plane transverse to the vertical plane of the wings 19. When one of the wings of the gate is attempted to be closed by operating the lever handle 20, the other wing is closed also by the synchronizer.

A pair of flat rectangular plates 33 are attached at one end by welding or otherwise to the top of each end portion of the pipe 14. The plates extend in opposite directions at right angles to the pipe, and the outer ends of the plates are connected in swivel relation to a pair of stop latches 34 (FIGS. 2 and 5). Attached to the top sides of the latch arms at the free end portions thereof are two flat irons 35 which are bent as shown in FIG. 8 so that the ends 38 are U-shaped. Also attached to the outer ends of the latch arms 34 is a coil spring 40 normally urging the latches to a closed position as shown in the solid lines in FIG. 8. In order to prevent the latch arms from moving in too far, a stop 36 is located on the top of each plate 33. The stops 36 may conveniently be made of a flat piece of steel about one-half inch wide, one inch long and one-half inch thick welded to the plates.

Secured to the top sides of the plates 33 are a pair of upright standards 41 the top ends of which are fastened to a sleeve 42. Operating in the sleeves is a rod 44 the ends of which are bent to form handles 45 of a lever for opening the latches. Stops 47 prevent side movement of the lever. At the midsection of the lever rod 44 are attached fingers 48 one of which can be used when the lever handles 45 are either in a horizontal or vertical position. The fingers are adapted to fit between the U-shaped ends 38 so that the latches may be opened as shown by the broken lines in FIG. 8 by manipulation of the lever handle 45.

As will be observed from FIG. 8, the flat irons 35 are bent first to form an upright portion, then a horizontal portion and finally another upright portion producing the U-shapped ends 38. The first upright portion and the horizontal portion form a vertical semi-rectangle making space for a bushing 50 which is about two inches in diameter and which is fastened by a bolt to a sleeve 46. The sleeve surrounds the pipe 14 and is connected on the underside to a cross arm 31 of the synchronizer. The bushing 50 may be made of hard rubber or other material suitable for a backstop. Abutting against the bushing when the gates are closed are a pair of stop braces 52 which are attached at one end to the latch arm 34 at the end portion which is attached to plates 33. The free ends 53 are bent at substantially right angles for abutting against the bushing 50, thereby locking the gates by preventing side movement of the arm 31.

Slidably mounted on the pipe 14 is an adjustable sleevelike stop 55 for limiting the size of the head space between the gates. The stop is secured to the pipe 14 by a set screw 56.

In the operation of the embodiment of the invention shown in the drawings and starting with the gate closed as pictured in FIG. 1, the door is cocked in an open position as shown in FIG. 3 by a down swing of the lever handle 45. The finger 48 presses against the left side of the U-shaped upright 38 expanding the spring 40 as shown in FIG. 8 and moving the stop braces 52 out of locking position against the bushing 50. The gate will open backwards as shown in FIG. 3. The locking mechanism will now be in the position shown in FIG. 6 with the gate opening outwardly instead of inwardly as in FIG. 3. To assist in opening the gates the arm 20 is moved in the appropriate direction. The stop 55 is set at a predetermine position depending on the size of the opening between the wings 19 desired. The size will depend on the type of animal and the size of its head.

The embodiment of the invention shown in the drawings is for purposes of illustration. Many variations may be made in the details of construction without departing from the spirit of the invention and such variations and modifications are considered as coming within the scope of the invention.

I claim:

1. A headgate for handling animals in cattleman operations and the like comprising:

a detachable stanchion, for installing in a chute-like opening, having top, bottom and side means forming a frame, a pair of gates pivoted for swinging on said side means and spaced to allow an opening when closed for the head of an animal to be restrained, and handle means at the side of said stanchion and attached to at least one of said gates to open and close the same, a synchronizing mechanism for operating the gates in unison when one gates is manipulated by said handle means, a stop means, for controlling the size of the head opining between the gates, having a sleeve slidably mounted on said top means of the frame and attached to said synchronizing mechanism, and an adjustable stop associated with said top means to limit the movement of said sleeve, and a locking mechanism, mounted on said top means of the frame, having a jam attached to said slidable sleeve, a pair of opposed braces for closing in on said jam and resulting in locking the gates, and lever means for releasing the braces from said stop means thereby allowing movement thereof and resulting in unlocking the gates.

2. A device as described in claim 1 in which each gate has a plate mounted on the top thereof to which said synchronizing mechanism is attached.

3. A device as described in claim 2 in which the synchronizing mechanism has a pair of arms pivotally connected to said plates and a cross bar pivotally connecting said arms.

4. A device as described in claim 1 in which the jam is an upright bushing containing rubber-like material as a backstop.

5. A device as described in claim 1 in which said braces are attached to a pair of latch arms pivotally secured at one end to said top means of the frame.

6. A device as described in claim 5 in which the other ends of the latch arms contain a pair of parallel upright standards which are normally urged together by a spring.

7. A device as described in claim 6 in which a lever with a finger to fit between said standards is mounted in association with said locking mechanism to open said latch arms and release the braces from said jam whereby the gates may be opened.

* * * * *